United States Patent [19]
Kress et al.

[11] Patent Number: 5,289,687
[45] Date of Patent: Mar. 1, 1994

[54] ONE-PIECE COWL FOR A DOUBLE ANNULAR COMBUSTOR

[75] Inventors: Eric J. Kress, Loveland; Joseph F. Savelli, West Chester; David W. Parry; John M. Koshoffer, both of Cincinnati, all of Ohio

[73] Assignee: General Electric Company, Cincinnati, Ohio

[21] Appl. No.: 860,398

[22] Filed: Mar. 30, 1992

[51] Int. Cl.⁵ .............................. F23R 3/50
[52] U.S. Cl. ....................... 60/747; 60/752
[58] Field of Search ............ 60/747, 39.36, 752, 60/753, 755, 756, 757

[56] References Cited

U.S. PATENT DOCUMENTS

| | | | |
|---|---|---|---|
| 2,686,401 | 8/1954 | Newcomb | 60/39.36 |
| 2,930,193 | 3/1960 | Jaramillo | |
| 2,973,624 | 3/1961 | Pierce et al. | |
| 2,996,884 | 8/1961 | Johnson et al. | 60/747 |
| 3,132,483 | 5/1964 | Lefebvre et al. | 60/747 |
| 3,132,484 | 5/1964 | Lefebvre et al. | |
| 3,750,397 | 8/1973 | Cohen et al. | |
| 4,211,069 | 7/1980 | Kalbfuss | |

OTHER PUBLICATIONS

Burrus, D. L., et al. "Energy Efficient Engine: Combustion System Component Technology Development Report", NASA R82AEB401. Nov., 1982. pp. 50, 287, and 456.

Primary Examiner—Richard A. Bertsch
Assistant Examiner—Timothy S. Thorpe
Attorney, Agent, or Firm—James P. Davidson; Jerome C. Squillaro

[57] ABSTRACT

A double annular combustor having concentrically disposed inner and outer annular combustors is provided with inner and outer domes. A one-piece cowl is provided upstream of the inner and outer domes in order to form a high pressure region. The one-piece cowl has an inner annular portion, an outer annular portion, and a radial middle portion connecting the inner and outer annular portions. The inner and outer annular portions include scalloped areas therein to facilitate insertion and removal of fuel tubes and nozzles. The cowl middle portion includes a shield to isolate the scalloped areas and the fuel tube from the high pressure region, thereby preventing leakage of air flow and consequential pressure loss from the high pressure region.

10 Claims, 3 Drawing Sheets

ONE-PIECE COWL FOR A DOUBLE ANNULAR COMBUSTOR

BACKGROUND OF THE INVENTION

1. Field of the Invention

This invention relates generally to the combustion system of a gas turbine engine and, more particularly, to a double annular combustor having concentrically disposed inner and outer annular combustors with inner and outer domes, and a one-piece cowl extending upstream of and connected to the inner and outer domes having an inner annular portion, an outer annular portion, and a radial middle portion connecting the inner and outer annular portions.

2. Description of Related Art

Efforts to reduce emissions in gas turbine engines have brought about the use of staged combustion techniques wherein one burner or set of burners is used for low speed, low temperature conditions such as idle, and another, or additional, burner or burners are used for high temperature operating conditions. One particular configuration of such a concept is that of the double annular combustor wherein the two stages are located concentrically in a single combustor liner. Conventionally, the pilot stage section is located concentrically outside and operates under low temperature and low fuel/air ratio conditions during engine idle operation. The main stage section, which is located concentrically inside, is later fueled and cross-ignited from the pilot stage to operate at the high temperature and relatively high fuel/air ratio conditions. The swirl cups of the respective pilot and main stage sections generally lie in the same radial and circumferential planes, as exemplified by U.S. Pat. No. 4,292,801 to Wilkes, et al. and U.S. Pat. Nos. 4,374,466 and 4,249,373 to Sotheran.

However, as discussed in a development report to the National Aeronautics and Space Administration (NASA) on combustion system component technology for the Energy Efficient Engine ($E^3$) and U.S. Pat. No. 4,194,358 to Stenger, the pilot stage and the main stage may be radially offset (i.e., lie in distinct radial planes). In both the '358 patent and $E^3$ configurations, the effective length of the main stage section is relatively short and the effective length of the pilot stage section is relatively long. This configuration allows for complete or near-complete combustion to reduce the amount of hydrocarbon and carbon monoxide emissions since there is a relatively long residence time in the pilot stage section and a relatively minimal residence time in the main stage section.

Whether the inner and outer combustors are radially aligned or not, and whether the outer annular combustor acts as the pilot stage or main stage, the prior art discloses the use of cowls immediately upstream of the dome region to control air flow coming into the combustor. This air flow is divided into three streams: an inner stream which flows into an inner liner passage defined by an inner liner of the combustor and a shell surrounding the liner; an outer stream which flows into an outer liner passage defined by an outer liner of the combustor and a shell surrounding the liner; and a center stream which flows into the combustor dome region defined by inner and outer cowling. Generally speaking, pressure losses occur in the regions where air flow is dumped into the liner passages. However, free stream diffusion occurs in the center stream upstream of the combustor cowlings, which produces a pitot tube effect for the air flow and results in low pressure losses in the region inside the combustor cowlings.

In applications where multiple combustor domes are used in conjunction with a prediffuser of conventional design, cowls which are designed to attain free stream diffusion tend to interfere with the insertion and removal of fuel tubes and nozzles and therefore require notches in the cowling known as "scallops." Such an arrangement is unacceptable due to an increase in pressure loss which occurs ahead of the domes and in the liner passages as air flow passes through the cowling as intended, but then passes back out through the scallops into the liner passages. Moreover, cowls which have been designed so as not to interfere with fuel tubes and nozzles (e.g., cowls having shorter length which do not extend as far upstream) also result in unacceptable pressure losses due to excessive flow spillage from inside the cowl caused by improper sizing of the cowl open area.

Accordingly, the present invention proposes a cowl design for combustors having multiple domes which eliminates the aforementioned problems of cowls heretofore known.

SUMMARY OF THE INVENTION

A double annular combustor having concentrically disposed inner and outer annular combustors is provided with inner and outer domes. A one-piece cowl is provided upstream of the inner and outer domes in order to form a high pressure region. The one-piece cowl has an inner annular portion, an outer annular portion, and a radial middle portion connecting the inner and outer annular portions. The inner and outer annular portions include scalloped areas therein to facilitate insertion and removal of fuel tubes and nozzles. The cowl middle portion includes a shield to isolate the scalloped areas and the fuel tube from the high pressure region, thereby preventing leakage of air flow and consequential pressure loss from the high pressure region.

BRIEF DESCRIPTION OF THE DRAWINGS

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
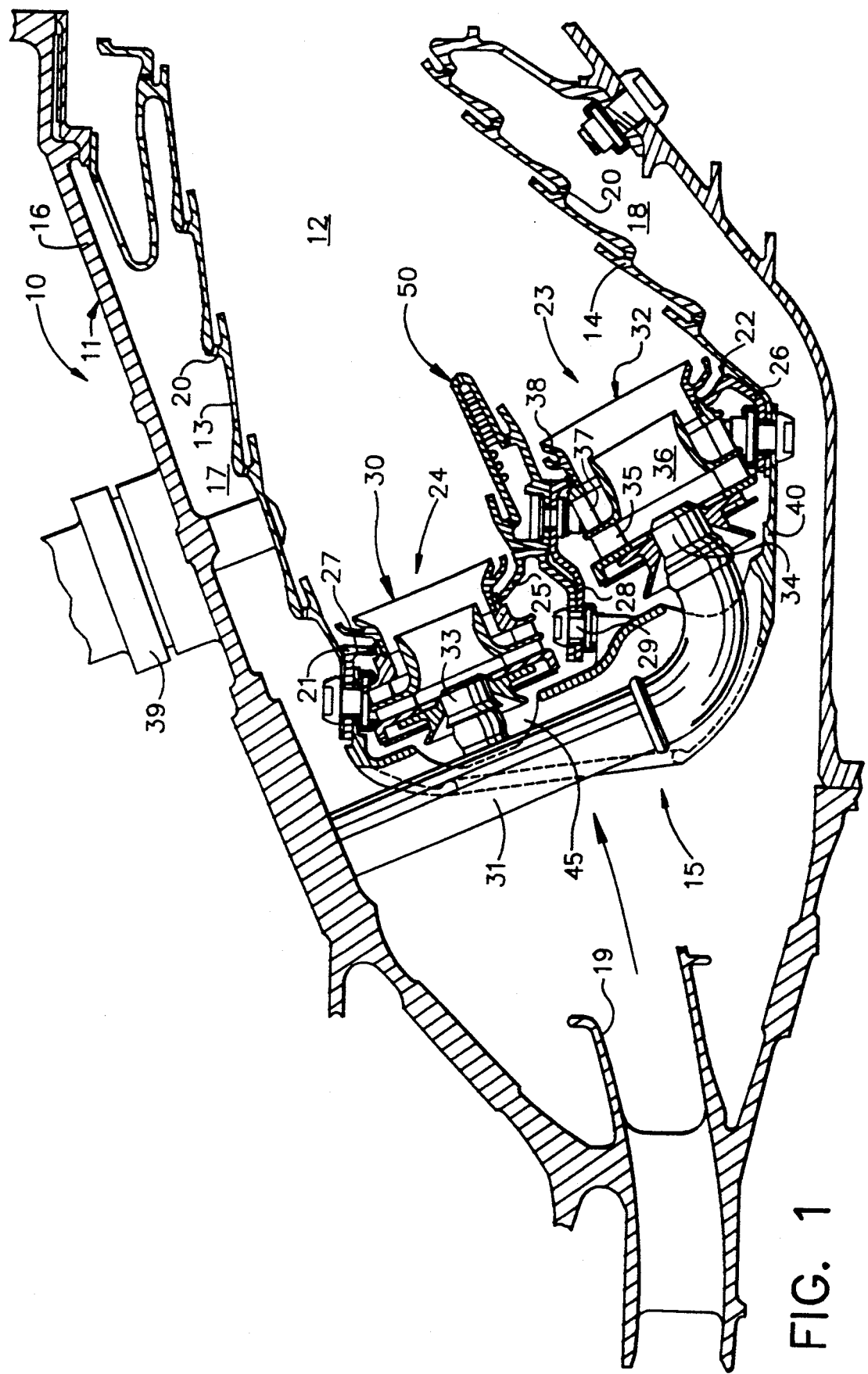
FIG. 1 is a transverse cross-sectional view of a double annular combustor in accordance with a preferred embodiment of the invention.

Referring now to the drawings in detail, wherein identical numerals indicate the same elements throughout the Figures, FIG. 1 depicts a continuous-burning combustion apparatus 10 of the type suitable for use in a gas turbine engine and comprising a hollow body 11 defining a combustion chamber 12 therein. Hollow body 11 is generally annular in form and is comprised of an outer liner 13 and an inner liner 14. At the upstream end of the hollow body 11 is an annular opening 15 for the introduction of air in a preferred manner as will be described hereinafter.

The hollow body 11 may be enclosed by a suitable shell 16 which, together with liners 13 and 14, defines outer passage 17 and inner passage 18, respectively, which are adapted to deliver in a downstream flow the pressurized air from a suitable source such as a compressor (not shown) and a diffuser 19. The compressed air from diffuser 19 passes principally into annular opening 15 to support combustion and partially to passages 17 and 18 where it is used to cool liners 13 and 14 by way of a plurality of apertures 20 and to cool the turbomachinery further downstream.

Disposed between and interconnecting outer and inner liners 13 and 14 near their upstream ends, are outer and inner domes 21 and 22, respectively, which preferably are separate and distinct dome plates attached to the liners by way of bolts, brazing or the like. Outer and inner dome plates 21 and 22 each have inner portions 25 and 26 and outer portions 27 and 28, respectively. Accordingly, outer dome plate outer portion 27 is connected to outer liner 13 and inner dome plate inner portion 26 is connected to inner liner 14. Outer dome inner portion 25 is connected to inner dome outer portion 28 by means of bolt 29.

Dome plates 21 and 22 are arranged in a so-called "double annular" configuration wherein the two form the forward boundaries of separate, radially spaced, annular combustors which act somewhat independently as separate combustors during various staging operations. For purposes of description, these annular combustors will be referred to as the inner annular combustor (main stage section) 23 and outer annular combustor (pilot stage section) 24, and will be more fully described hereinafter.

Located between inner annular combustor 23 and outer annular combustor 24 in the preferred embodiment of FIG. 1 is a centerbody 50 which acts to partially define the common boundary between inner and outer annular combustors 23 and 24, respectively. Centerbody 50 conducts the flow of air rearwardly to, in effect, extend the common boundary so that a high pressure area tends to restrain the combustive gases of inner annular combustor 23 from entering outer annular combustor 24 and vice versa. Centerbody 50 is the subject matter of a separate patent application filed concurrently herewith, Ser. No. 07/859,760, and is hereby incorporated by reference.

Disposed in outer annular combustor 24 is a plurality of circumferentially spaced carburetor devices 30 with their axes being coincident with that of outer annular combustor 24 and aligned substantially with outer liner 13 to present an annular combustor profile which is substantially straight. It should be understood that carburetor device 30 can be of any of various designs which acts to mix or carburet the fuel and air for introduction into combustion chamber 12. One design might be that shown and described in U.S. Pat. No. 4,070,826, entitled "Low Pressure Fuel Injection System," by Stenger et al, and assigned to the assignee of the present invention. In general, carburetor device 30 receives fuel from a fuel tube 31 through fuel nozzle 33 and air from annular opening 15, with the fuel being atomized by the flow of air to present an atomized mist of fuel to combustion chamber 12.

In a manner similar to outer annular combustor 24, inner annular combustor 23 includes a plurality of circumferentially spaced carburetor devices 32 whose axes are aligned substantially parallel to the axis of carburetor device 30. Carburetor devices 32, together with inner dome plate 22, inner liner 14 and centerbody 50 define inner annular combustor 23 which may be operated substantially independently from outer annular combustor 24 as mentioned hereinbefore. Once again, the specific type and structure of carburetor device 32 is not important to the present invention, but should preferably be optimized for efficiency and low emissions performance. For description purposes only, and except for considerably higher airflow capacity, carburetor device 32 is identical to carburetor device 30 and includes a fuel nozzle 34 connected to fuel tube 31 for introducing fuel which is atomized by high pressure or introduced in a liquid state at a low pressure. A primary swirler 35 receives air to interact with the fuel and swirl it into venturi 36. A secondary swirler 37 then acts to present a swirl of air in the opposite direction so as to interact with the fuel/air mixture to further atomize the mixture and cause it to flow into combustion chamber 12. A flared splashplate 38, which preferably is integral with the swirl cup, is employed at the downstream end of carburetor device 32 so as to prevent excessive dispersion of the fuel/air mixture. This integral splashplate/swirl cup 38 is the subject of a separate patent application (Ser. No. 07/800,332) by the assignee and is filed concurrently herewith; the subject matter of which is hereby incorporated by reference. An igniter 39 is installed in outer liner 13 so as to provide ignition capability to outer annular combustor 24.

Figure 2:
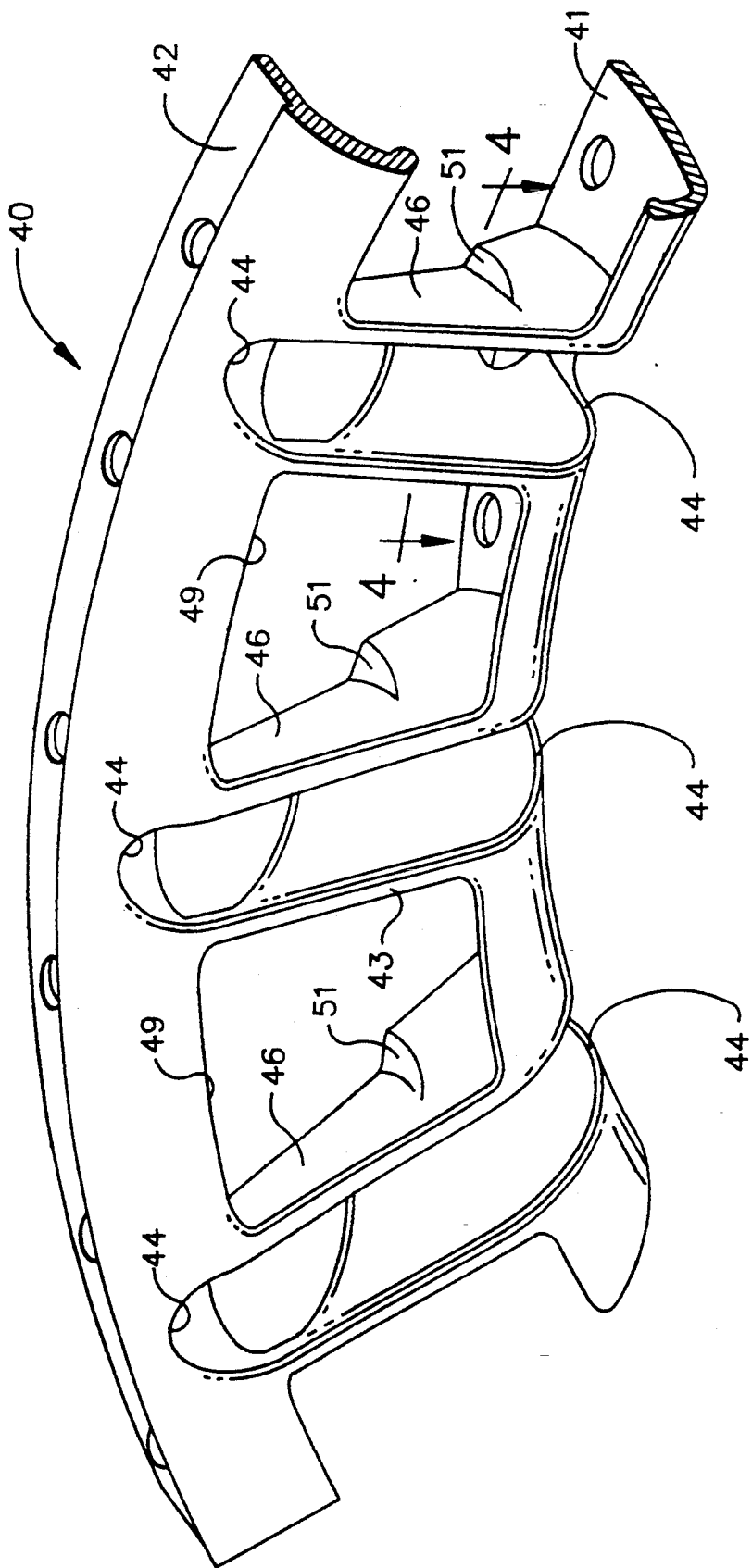
FIG. 2 is a partial, forward perspective view of the one-piece cowl depicted in FIG. 1, where the fuel nozzles and domes have been omitted for clarification.
Figure 3:
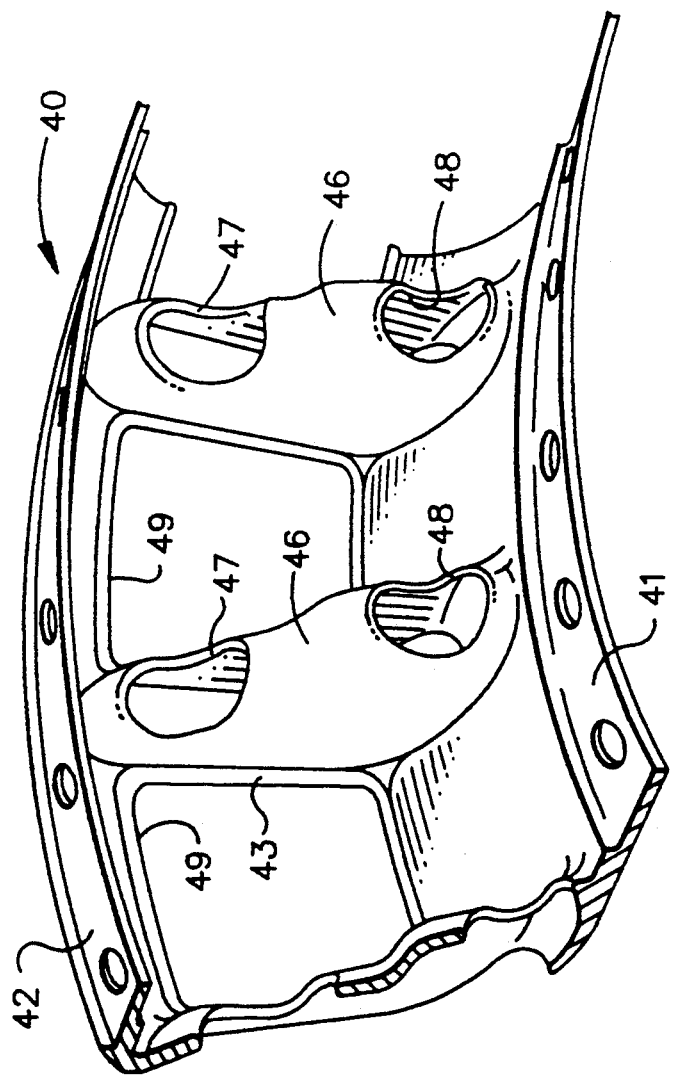
FIG. 3 is a partial, aft perspective view of the one-piece cowl depicted in FIG. 1, where the fuel nozzles and domes have been omitted for clarification.

A one-piece cowl 40 is provided in order to stabilize the dome structure, protect carburetor devices 30 and 32, and maintain a high pressure region 45 immediately upstream of carburetor devices 30 and 32. As best seen in FIGS. 2 and 3, cowl 40 includes an inner annular portion 41, an outer annular portion 42, and a radial middle portion 43 connecting inner and outer annular portions 41 and 42. Inner and outer annular portions 41 and 42 include notches known as "scallops" therein which are shown at 44. These scalloped areas 44 are designed so that fuel tube 31 can fit snugly to inner and outer annular portions 41 and 42, as well as facilitate insertion and removal of fuel tube 31 and fuel nozzles 33 and 34.

Figure 4:
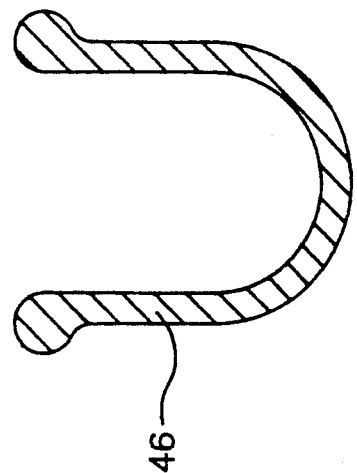
FIG. 4 is a partial cross-sectional view of the shield taken along section line 4—4 in FIG. 2.

In order to isolate scalloped areas 44 and fuel tube 31 from high pressure region 45, as well as to prevent pressure losses resulting from air flow flowing out of high pressure region 45, a shield 46 is provided along the downstream side of cowl middle portion 43. Shield 46 includes a pair of openings 47 and 48 which allow fuel nozzles 33 and 34, respectively, to pass therethrough and be connected to carburetor devices 30 and 32. Shield 46 is generally U-shaped in the axial direction, as best illustrated by FIG. 4. Preferably, the open end of shield 46 is substantially aligned with and adjacent to scalloped areas 44 in inner and outer annular portions 41 and 42. It will also be noted that due to the axial offset between inner and outer annular combustors 23 and 24, shield 46 extends axially downstream from top to bottom.

As seen in FIGS. 2 and 3, window-like openings 49 are provided in middle portion 43 between shields 46 to allow free stream diffusion of incoming air flow. Window-like openings 49 are preferably substantially rectangular in shape, but may take other forms as required.

In addition to maintaining high pressure region 45, one-piece cowl 40 also provides resistance to deformation due to its inherent stiffness. Accordingly, it is preferred that cowl 40 be cast into a single piece. In order to enhance the structural stability of shield 46, a step portion 51 is provided thereon. Step portion 51 is preferably located between openings 47 and 48 and assists in enhancing the lower half of shield 46.

In accordance with cowl 40 of the present invention, high pressure region 45 is maintained immediately upstream of inner and outer annular combustors 23 and 24. Specifically, cowl 40 includes scalloped areas 44 in inner and outer annular portions 41 and 42, which facilitate insertion and removal of fuel tubes 31 and fuel nozzles 33 and 34, while also providing shields 46 for preventing air flow from escaping high pressure region 45 through scalloped areas 44. Further, cowl 40 is properly sized to prevent excessive flow spillage from within high pressure region 45. While shields 46 isolate scalloped areas 44 and fuel tubes 31 from high pressure region 45, window-like openings 49 in middle portion 43 still allow free stream diffusion of the air flow into high pressure region 45.

Considering now the operation of the above-described double annular combustor, outer annular combustor 24 and inner annular combustor 23 may be used individually or in combination to provide the desired combustion condition. Preferably, outer annular combustor 24 is used by itself for starting and low speed conditions and will be referred to as the pilot stage. The inner annular combustor 23 is also used at higher speed, higher temperature conditions and will be referred to as the main stage combustor. Upon starting the engine and for idle condition operation, carburetor devices 30 are fueled by way of fuel tubes 31, and pilot stage 24 is ignited by way of igniter 39. The air from diffuser 19 will flow as shown by the arrows, both through active carburetor devices 30 and through inactive carburetor devices 32. During these idle conditions, wherein both the temperatures and airflow are relatively low, pilot stage 24 operates over a relatively narrow fuel/air ratio band and outer liner 13, which is in the direct axial line of carburetor devices 30, will see only narrow excursions in relatively cool temperature levels. This will allow the cooling flow distribution in apertures 20 to be maintained at a minimum. Further, because outer annular combustor 24 and inner annular combustor 23 lie in distinct axial planes, pilot stage 24 is relatively long as compared with main stage 23 and the residence time will preferably be relatively long to thereby minimize the amount of hydrocarbon and carbon monoxide emissions.

As the engine speed increases, fuel is introduced by fuel tube 31 into carburetor devices 32 through fuel nozzles 34 so as to activate main stage 23. During such higher speed operation, pilot stage 24 remains in operation but main stage 23 consumes the majority of the fuel/air mixture. It will be recognized that main stage 23 is axially short in length when compared with pilot stage 24 due to the axial offset therebetween, whereby the residence time will be relatively short to reduce the NOx emissions.

It will be understood that the present invention has been described in terms of particular embodiments, but may take on any number of forms while remaining within the scope and intent of the invention. For example, it will be recognized that the present invention would be applicable to any double annular combustor, whether the inner and outer annular combustors lie in distinct radial and circumferential planes or not. In addition, the cowl of the present invention could easily be modified for use with combustors having a single dome or one having more than two domes.

Having thus described the invention, what is claimed and desired to be secured by Letters Patent of the United States is:

1. A double annular combustor having concentrically disposed inner and outer annular combustors, comprising:
   a) an inner dome having an inner portion and an outer portion;
   b) an outer dome having an inner portion and an outer portion, said outer dome inner portion being connected to said inner dome outer portion;
   c) a carburetor contained in each of said inner and outer domes;
   d) a one-piece cowl upstream of said inner and outer domes which forms a high pressure region between said cowl and said domes, said cowl having an inner annular portion, an outer annular portion, and a radial middle portion connecting said inner and outer cowl annular portions upstream and structurally independent of said outer dome inner portion and said inner dome outer portion;
   e) an inner liner connected to said inner dome inner portion and said cowl inner annular portion; and
   f) an outer liner connected to said outer dome outer portion and said cowl outer annular portion.

2. The double annular combustor of claim 1, wherein said cowl inner and outer annular portions include scalloped areas so as to allow fuel tubes to pass therethrough.

3. The double annular combustor of claim 2, wherein said cowl middle portion includes a plurality of shields on the downstream side thereof between said cowl inner annular and outer annular portions, wherein said scalloped areas are isolated from said high pressure region.

4. The double annular combustor of claim 3, wherein a pair of openings are provided in said shield to allow fuel nozzles to pass therethrough, said openings being substantially aligned with said carburetors.

5. The double annular combustor of claim 3, wherein window-like openings are provided in said cowl middle portion between said shields, wherein free stream diffusion of incoming airflow occurs.

6. The double annular combustor of claim 5, wherein said window-like openings are substantially rectangular.

7. The double annular combustor of claim 3, wherein said shield is substantially U-shaped in the axial direction, the open end of said shield being substantially aligned with and adjacent to said scalloped areas.

8. The double annular combustor of claim 4, wherein said inner dome is radially offset downstream of said outer dome.

9. The double annular combustor of claim 8, wherein said shield extends radially downstream from top to bottom thereof.

10. The double annular combustor of claim 9, wherein said shield includes a step portion located between said openings.

* * * * *